(No Model.) 2 Sheets—Sheet 1.
G. W. STEVENSON.
BEAN THRASHER.
No. 551,911. Patented Dec. 24, 1895.
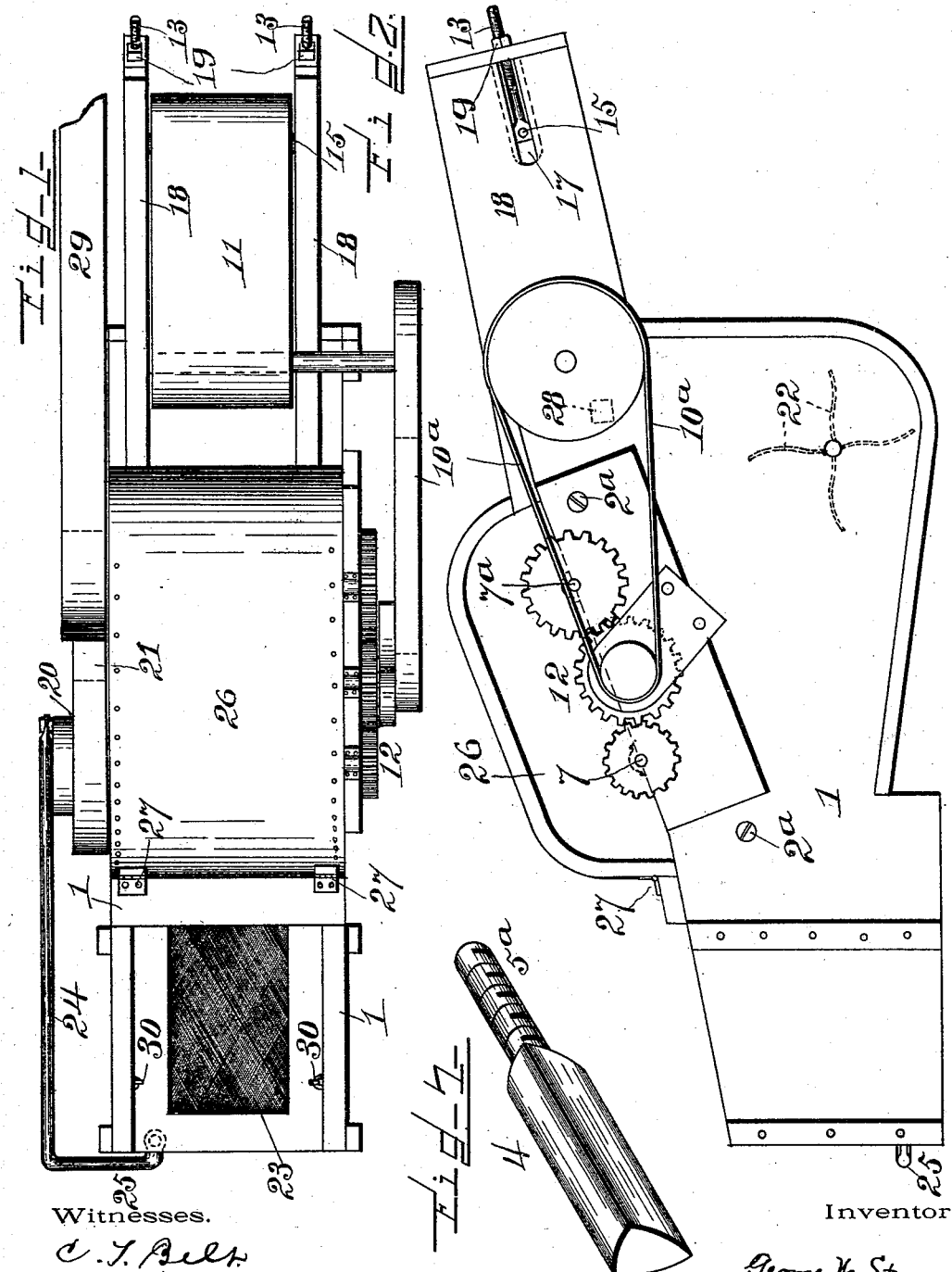
Witnesses.
Inventor.
George W. Stevenson
By W. H. Wills,
Attorney.

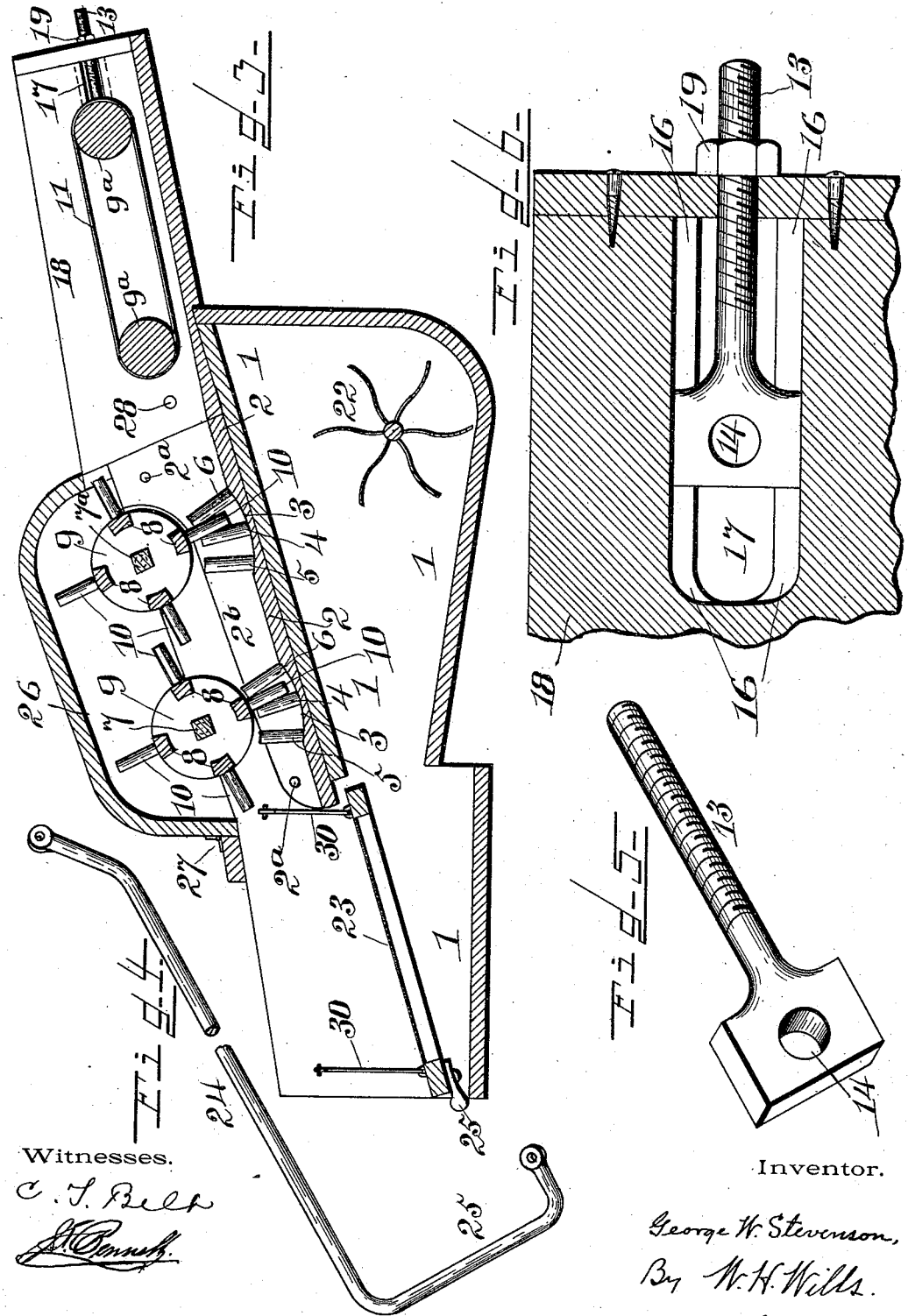

UNITED STATES PATENT OFFICE.

GEORGE W. STEVENSON, OF FORDYCE, ARKANSAS.

BEAN-THRASHER.

SPECIFICATION forming part of Letters Patent No. 551,911, dated December 24, 1895.

Application filed July 11, 1895. Serial No. 555,606. (No model.)

*To all whom it may concern:*

Be it known that I, GEORGE W. STEVENSON, a citizen of the United States, residing at Fordyce, in the county of Dallas and State of Arkansas, have invented certain new and useful Improvements in Bean-Thrashers; and I do hereby declare the following to be a full, clear, and exact description of the invention, such as will enable others skilled in the art to which it appertains to make and use the same.

This invention relates to thrashing-machines, and particularly to a pea or bean huller, and its novelty will be fully understood from the following description and claims when taken in connection with the annexed drawings, and the object of the invention is to provide a simple, inexpensive, yet durable machine for thrashing peas, beans, and other seed, so that the same may be quickly and thoroughly hulled, cleaned, and separated.

With these objects in view the invention consists in the novel construction and arrangement of parts, as will be hereinafter fully described, and set up in the claim.

Figure 1 is a top view of my machine. Fig. 2 is a side elevation. Fig. 3 is a central longitudinal section of Fig. 1. Fig. 4 is a perspective view of the screen crank-arm. Fig. 5 is a perspective view of one of the screws used to tighten the seed-conveyer. Fig. 6 is a sectional view taken through the portion of the side of the conveyer-frame having grooves in which the heads of the tightening-screws slide. Fig. 7 is a perspective view of one of the teeth or fingers.

The same reference-numerals denote the same parts throughout the several figures of the drawings.

The main frame 1 is of ordinary construction, having a seedway 2, with concavities 3, said concavities having three sets or series of thrashing-fingers 4, 5, and 6, the special shape of which will be hereinafter more fully described. The middle set or series of fingers 4 project at right angles to the concavities, and the sets of fingers 5 and 6 are inclined toward the said middle fingers, so that the space or interval between the three sets of fingers is less at the top than at the bottom of the fingers, in order to confine the seed to be thrashed or hulled to the concavities and not allow it to crowd up to the top of the fingers and choke the machine. The seedway 2 is removably secured in place by means of the set-screws $2^a$ passed through the sides of the main frame 1 and the sides $2^b$ of the seedway 2.

Upon the shafts 7 and $7^a$, journaled in the main frame 1, is mounted a skeleton drum comprising the solid closed ends 9 and the ribs 8, each of the latter being provided with thrashing-teeth 10. The teeth 10 of one drum interlock with the teeth of the other drum, and the teeth of each drum are revolved between the thrashing-fingers 4, 5, and 6 of the concavities, thus producing certain and perfect thrashing of the seed.

The seed is carried into or upon the seedway by the endless apron or carrier 11 revolved by a belt connection $10^a$ from the gear 12 of the two shafts 7 and $7^a$, the latter being driven by belt 29. This apron 11 is loosened or tightened, as desired, upon its rollers $9^a$ by means of the slidable screws 13, having a T-shaped head provided with a journal-bearing 14 for the ends of the apron-shaft 15. The head engages grooves 16 in the face of the slots 17 in the side ends of the apron-frame 18. The fact of providing means for controlling the tension of the apron upon its rollers is very essential, because the apron being the only conveyer of seed to the machine the constant weight of the seed will stretch and slacken the apron, whereupon the nuts 19 of the screws 13 have only to be operated to give the desired tension. The seed fall from their apron onto the seedway 2 and are hulled or thrashed in the concavities by the operation of the fingers and teeth, as hereinbefore described.

A pulley 20 and belt 21 revolve the fan 22 to blow the light refuse of the seed which falls from the seedway 2 from the sifting-screen 23. The latter is hung from the sides of the main frame 1 by hangers 30, and is operated by means of the crank-arm 24, which arm has a U-shaped end 25 attached to the screen 23, while its other end is secured to the said pulley 20.

The thrasher teeth and fingers have a screw-threaded end to be readily fixed in place, and the body or portions of the teeth which come in contact with the seed are substantially V-shaped in cross-section with convex back, and convex sides converging into a front edge. (See Fig. 7.) The special form of this tooth is highly essential, as they do not cut, mutilate, or otherwise destroy the beans, but the latter are squeezed out of their hulls gradually as the teeth come together and are delivered sound and clean.

For convenience in getting at the drums 7 and 7ª for cleaning and repairing or other purposes, the top 26 of the machine is hinged at 27.

For convenience in packing or transportation the endless-apron frame is detachably secured to the main frame 1 by screw-bolts 28, and the seedway being likewise detachable from the main frame 1 renders the interior of the machine readily accessible and more convenient for cleaning and repairing.

Having thus described my invention, what I claim as new, and desire to secure by Letters Patent, is—

The combination with a bean thrasher, of the thrasher fingers and teeth having a screw threaded end, a convex back, and convex sides converging into a front edge, substantially as set forth.

In testimony whereof I affix my signature in presence of two witnesses.

GEORGE W. STEVENSON.

Witnesses:
J. N. McDADE,
R. H. DEDMAN, Jr.